June 26, 1945.  E. REICH  2,378,950
METHOD OF PREPARING FOOD
Original Filed Oct. 2, 1937    7 Sheets-Sheet 1

Inventor
Ernest Reich by Merrill M. Blackburn
Attorney

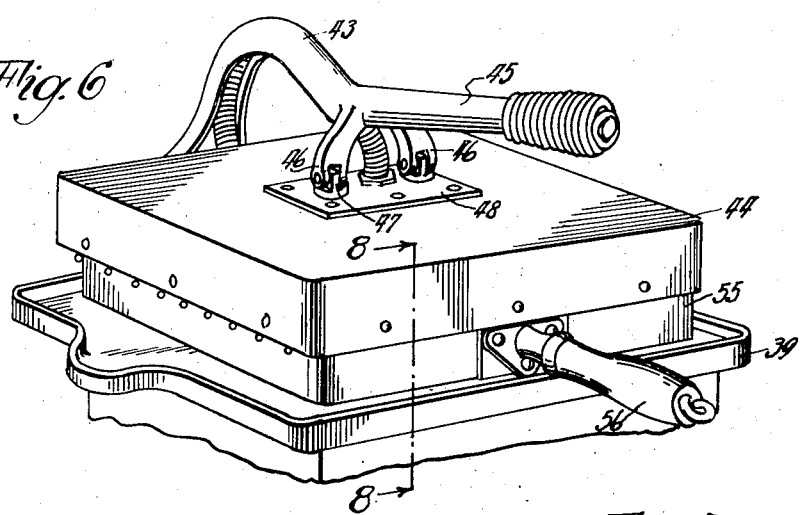
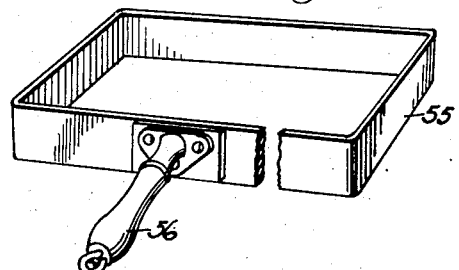
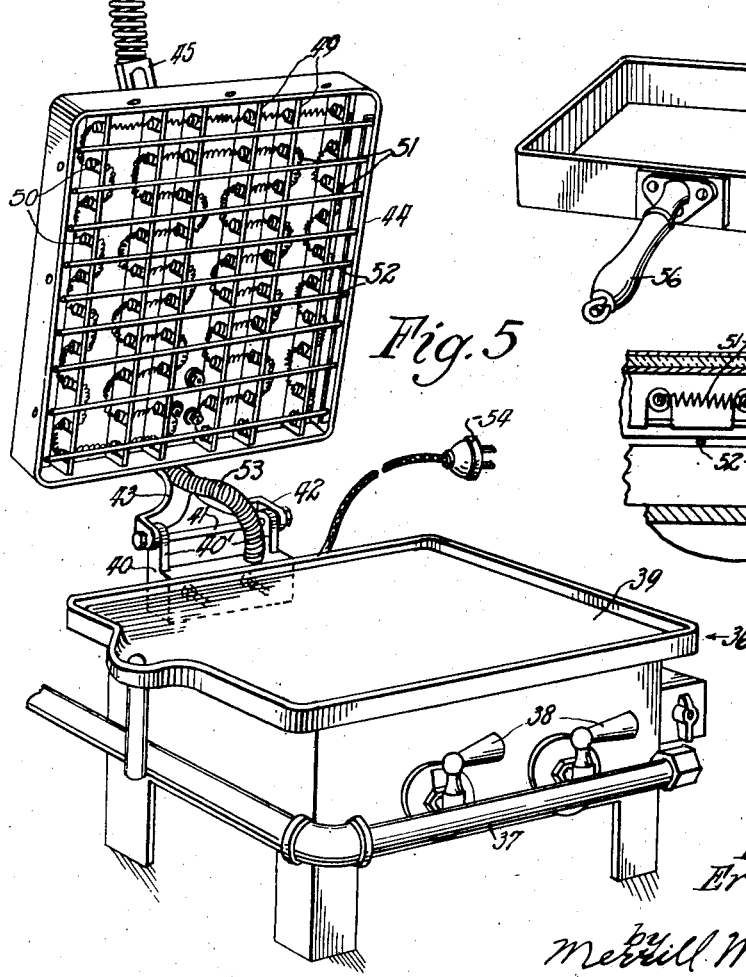
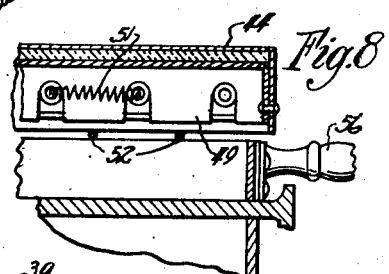

Inventor
Ernest Reich

June 26, 1945.  E. REICH  2,378,950
METHOD OF PREPARING FOOD
Original Filed Oct. 2, 1937   7 Sheets-Sheet 4

Inventor
Ernest Reich
by Merrill M. Blackburn.
Attorney.

June 26, 1945. E. REICH 2,378,950
METHOD OF PREPARING FOOD
Original Filed Oct. 2, 1937 7 Sheets-Sheet 5
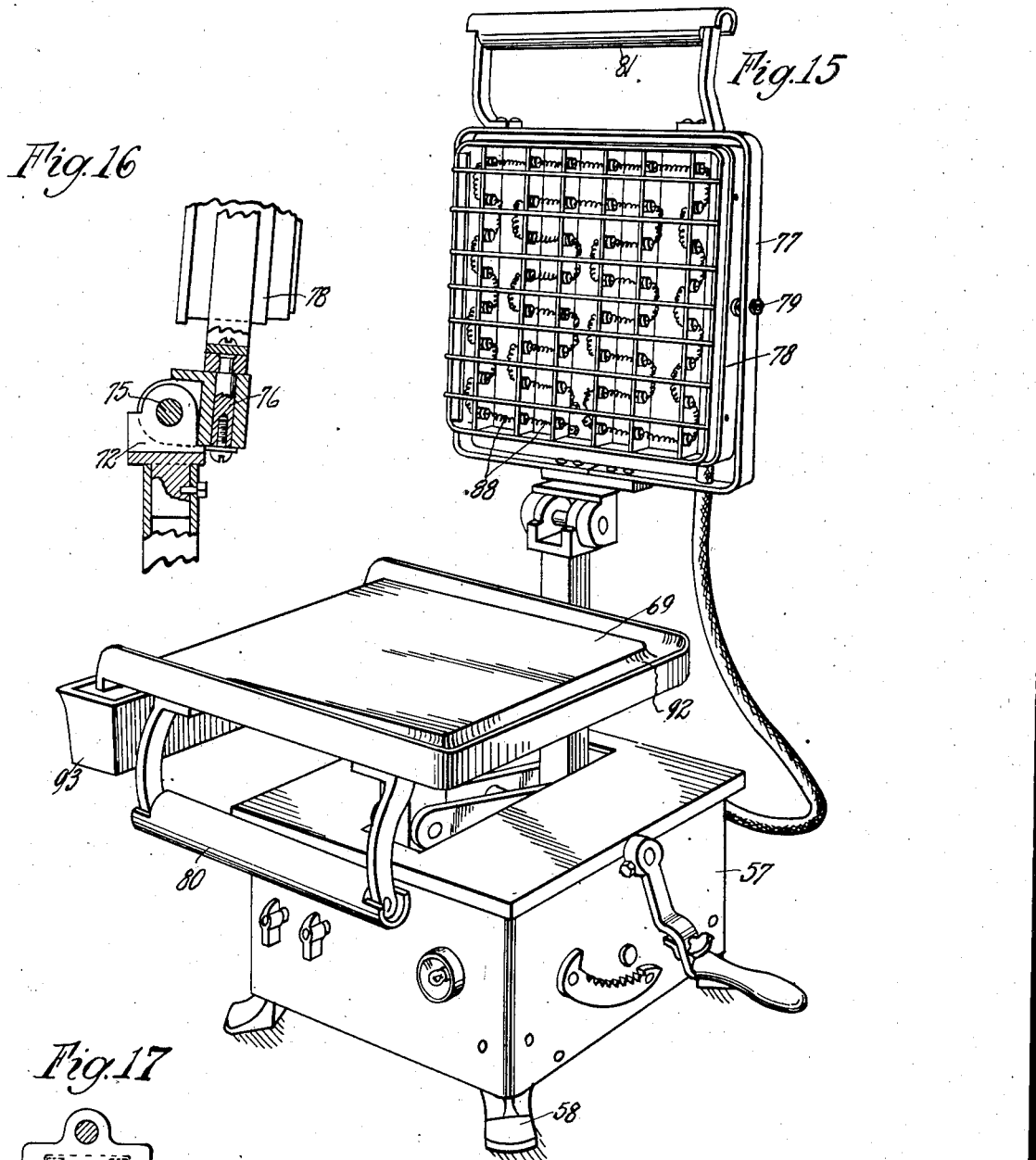
Inventor
Ernest Reich
by Merrill M. Blackburn
Attorney

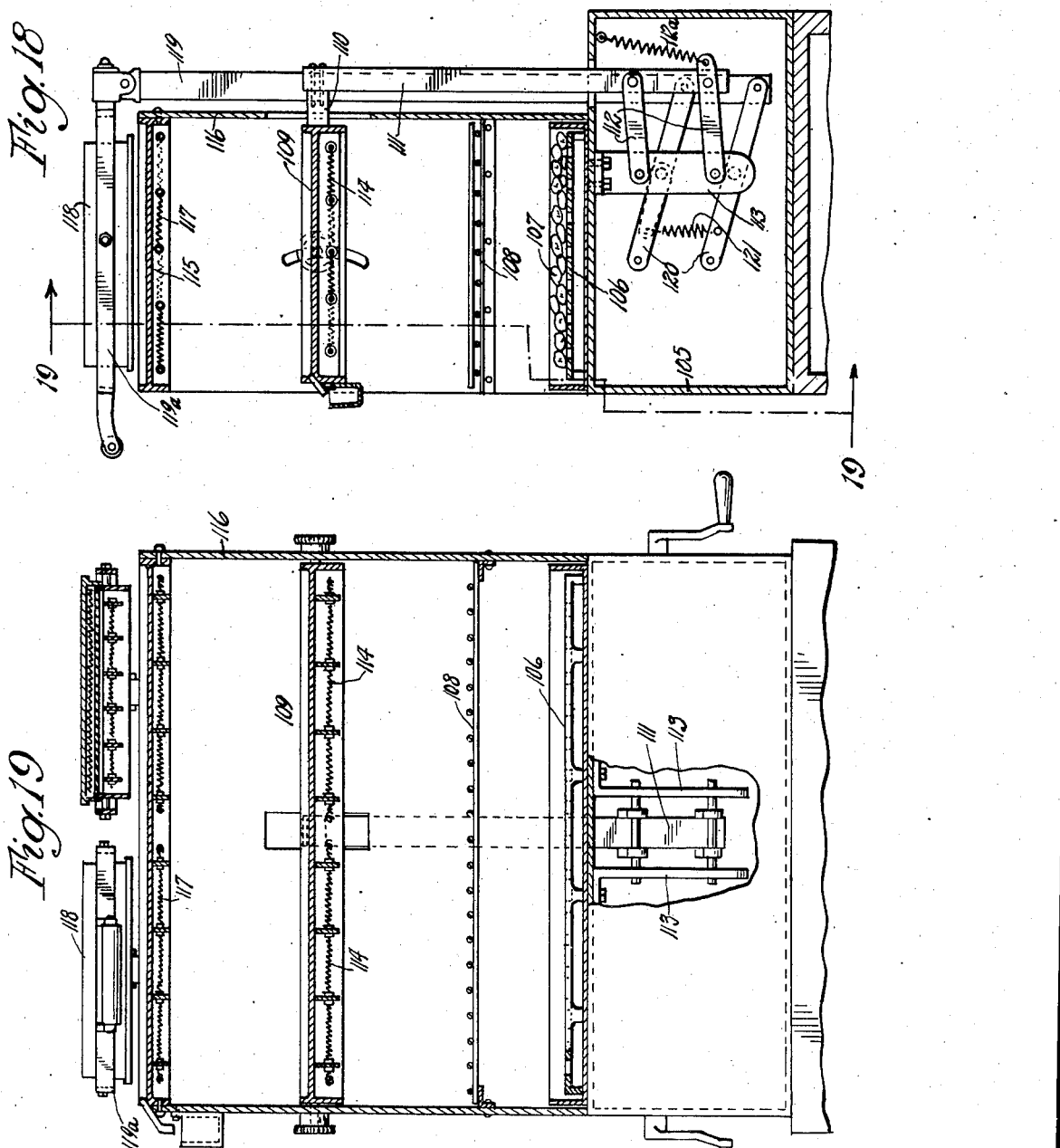

Inventor
Ernest Reich
by Merrill M. Blackburn
Attorney.

Patented June 26, 1945

2,378,950

UNITED STATES PATENT OFFICE 2,378,950

METHOD OF PREPARING FOOD

Ernest Reich, Quakertown, Pa.

Original application October 2, 1937, Serial No. 166,987. Divided and this application October 22, 1941, Serial No. 416,131

6 Claims. (Cl. 99—1)

The invention relates to the art of preparing food and, more particularly, to a novel method and apparatus for imparting heat to food or other substances, and is a division of my application, Serial No. 166,987, filed October 2, 1937.

While the present invention is described primarily in conjunction with the preparation of food, yet its utility extends beyond that scope, and may be applied wherever heat influence is desired to modify, alter or vary the physical or chemical properties of substances.

The art of preparing food includes boiling, frying, grilling, broiling, baking, toasting and parboiling. In these various forms the food is either exposed to conducted heat, such as by boiling, frying or grilling, or is exposed to radiant glow heat, such as broiling, toasting.

The distinction made between the two kinds of heat is based on whether or not the heat is directly received from the heat source or indirectly by the interposition of a conductor.

The prime object of the invention constitutes a novel method of, and means for, preparing food by a combination of conducted heat and radiant heat applied simultaneously or successively.

A further object aims at preparing food by the application of conducted heat to the food under pressure and, likewise, by the application of radiant glow heat under pressure.

It is a further object to prepare food by the application of conducted and radiant glow heat which imparts flavor to the food, and effects the coloring thereof without diminishing the juice content thereof.

It is a further object of the invention to provide a heating element which, at one side, gives off conducted heat and, at the other, radiant glow heat.

A further object aims at providing a heating device having a pair of cooperating heating elements, one of said elements emitting conducted heat, and the other of said elements emitting, at one side, conducted heat, and at the other side, radiant glow heat.

A still further object aims at making the heating element emitting conducted and radiant heat reversible, so that it may cooperate with the companion element, with either conducted or radiant glow heat.

Another object aims at subjecting food at one side to conducted heat and, at the other side, to radiant glow heat, so that the coloring of food is effected without the usual loss of moisture.

With these and other equally important objects in view, which will become apparent from a perusal of the invention, the latter comprises the steps of a novel method practiced by means described in the following specification, particularly pointed out in the claims forming a part thereof, and illustrated in the accompanying drawings, in which:

Fig. 5 is a perspective view of a heating device constructed in accordance with my invention.

Fig. 6 is a perspective view of a structure similar to Fig. 5 with a part added and with the parts in operative position.

Fig. 7 is a perspective view of a frame used with the heating device.

Fig. 8 is a fragmentary section on the line 8—8 of Fig. 6.

Fig. 15 is a perspective view similar to Fig. 9, with the top heating element reversed to bring the radiant heat in juxtaposition with the lower heating element.

Fig. 16 is a section through the pivotal joint for the upper heating element.

Fig. 17 is a front view of the joint when the element is in functional position.

Fig. 18 is a sectional side elevation of a further modification depicting a plurality of heating elements in tower arrangement.

Fig. 19 is a section on the line 19—19 of Fig. 18.

Figure 1:
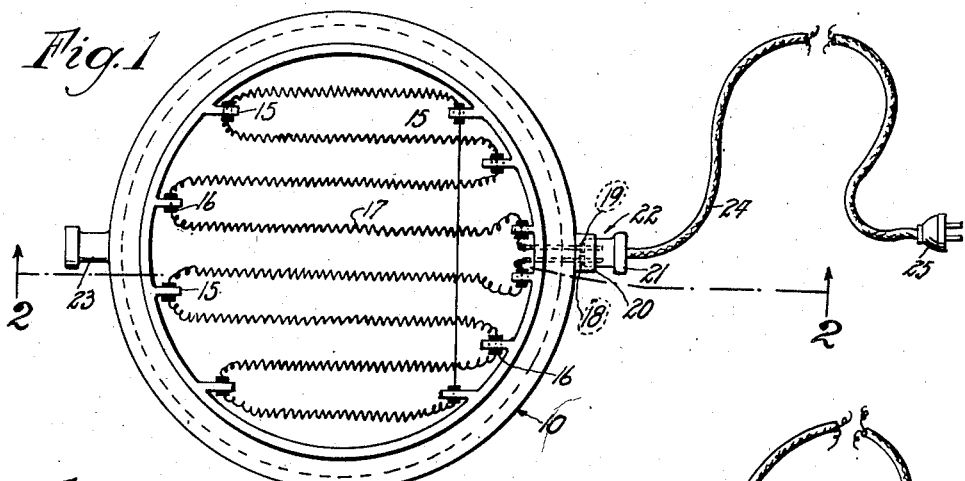
Fig. 1 is a top plan view of a cover for a skillet constructed in accordance with my invention.
Figure 2:
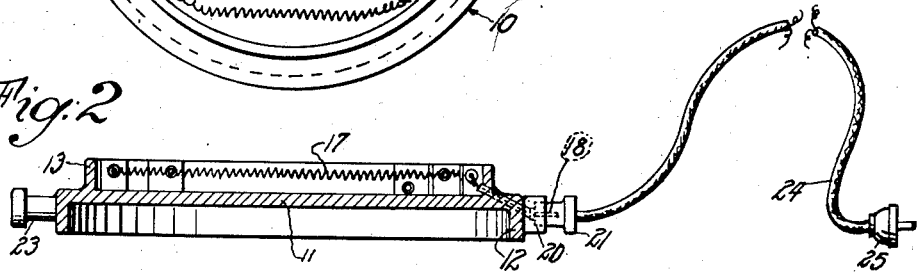
Fig. 2 is a section on the line 2—2 of Fig. 1.

In the art of preparing food, heat is applied by bringing the food in contact with a plate which is heated, either by gas, coal or electricity, or other means. The heat thus generated and conducted through the plate is imparted by contact to the food, and such heat is designated as "conducted heat."

Again, if food is exposed to the influence of heat from a flame, or other heat source, directly acting on the food without the intervention of a conductor, it is designated as "radiant heat."

In preparing food, which is distinguished by taste, flavor and appearance, after many experiments and attempts, it has been established that the food must retain its natural juice and, in addition, flavor and appearance are important factors.

To this end, a combination process is evolved whereby the food is subjected, at one side, to conducted heat and, at the other side, to radiant heat, so that the impingement of heat, from both sides, eliminates the evaporation of juice, and yet a "charcoal" effect or developed flavor is imparted by the radiant heat, without the disadvantages attendant to charcoal broiling.

Again, it has been found that excellent results are obtained if the food is first subjected to conducted heat on both sides for a short time, whereupon one side only is subjected to radiant heat, while the other side remains under the influence of conducted heat.

Preferably, although not necessarily, the food is subjected to pressure while under the influence of the conducted and the radiant heat.

Referring to the drawings, and particularly to Figs. 1 to 4, inclusive, 10 generally designates a cover, which comprises a disk 11 formed with a downwardly extending flange 12, adapted to encompass a skillet or other cooking utensil.

While the disk in the present instance is shown circular, it is, of course, understood that any other shape or configuration may be selected to conform to the contour of the particular cooking utensil.

The disk is also provided with an upstanding annular flange 13 of smaller diameter than the disk 11 so that, upon reversal of the cover, the flange 13 projects into a cooking utensil.

The flange 13 is provided with a plurality of lugs 15 which are apertured to receive insulating bushings 16 through which is strung a heating element or wire 17 whose ends lead to contact terminals 18 and 19 in a socket 20, adapted to receive a plug 21 which complements said socket to provide a handle 22. Diametrically opposite to handle 22 is another handle 23, whereby manipulation of the cover is facilitated.

From the plug 21 leads a cable 24 to another plug 25, which may be inserted in the usual house socket constituting a source of electrical energy for heating the wire 17.

Figure 3:
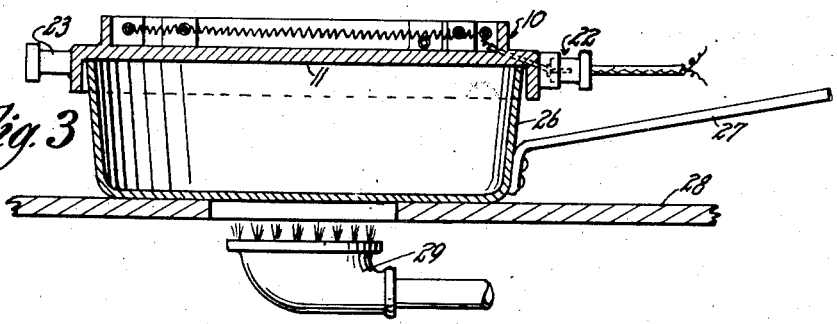
Fig. 3 is a section through a skillet to which the cover is applied.

In Fig. 3 the cover is applied to a skillet 26, equipped with a handle 27, and shown on the top plate 28 of a kitchen stove where a burner 29 supplies heat to the skillet.

Figure 4:
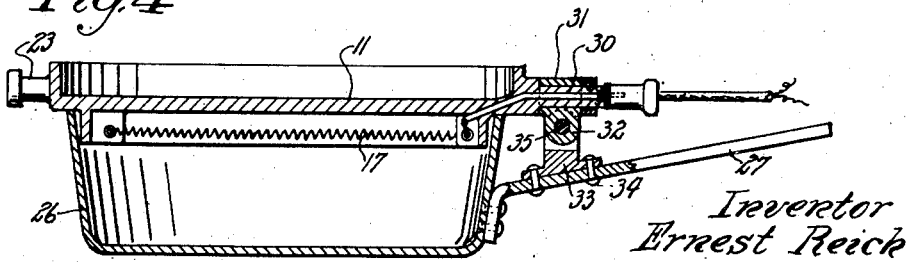
Fig. 4 is a view similar to Fig. 3, with the cover in reversed position and permanently secured to the skillet.
Figure 9:
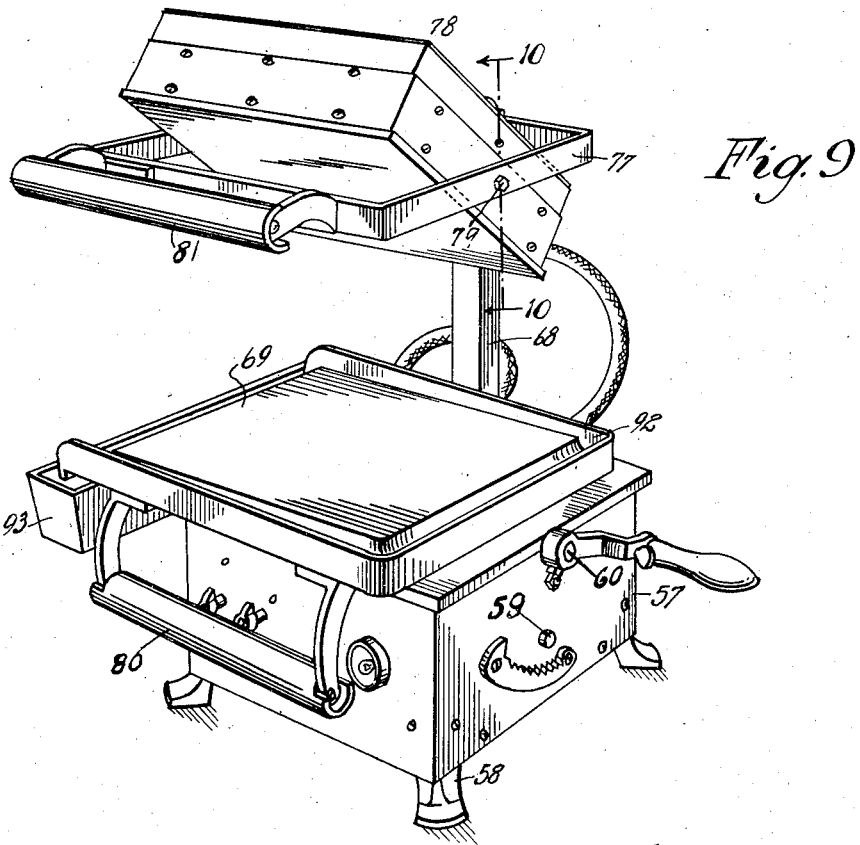
Fig. 9 is a perspective view of a heating device wherein one of the heating elements is constructed to emit conducted heat at one side, and radiant heat at the other side.
Figure 10:
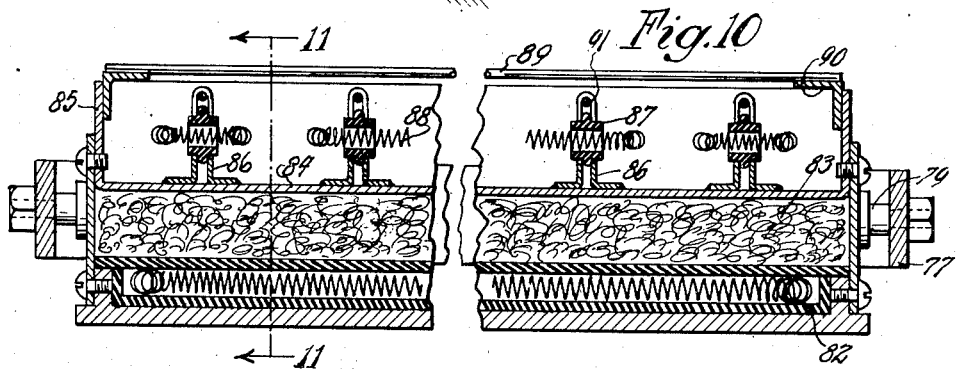
Fig. 10 is an enlarged section on the line 10—10 of Fig. 9.
Figure 11:
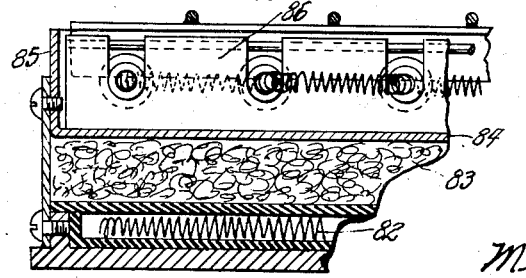
Fig. 11 is a fragmentary section on the line 11—11 of Fig. 10.
Figure 12:
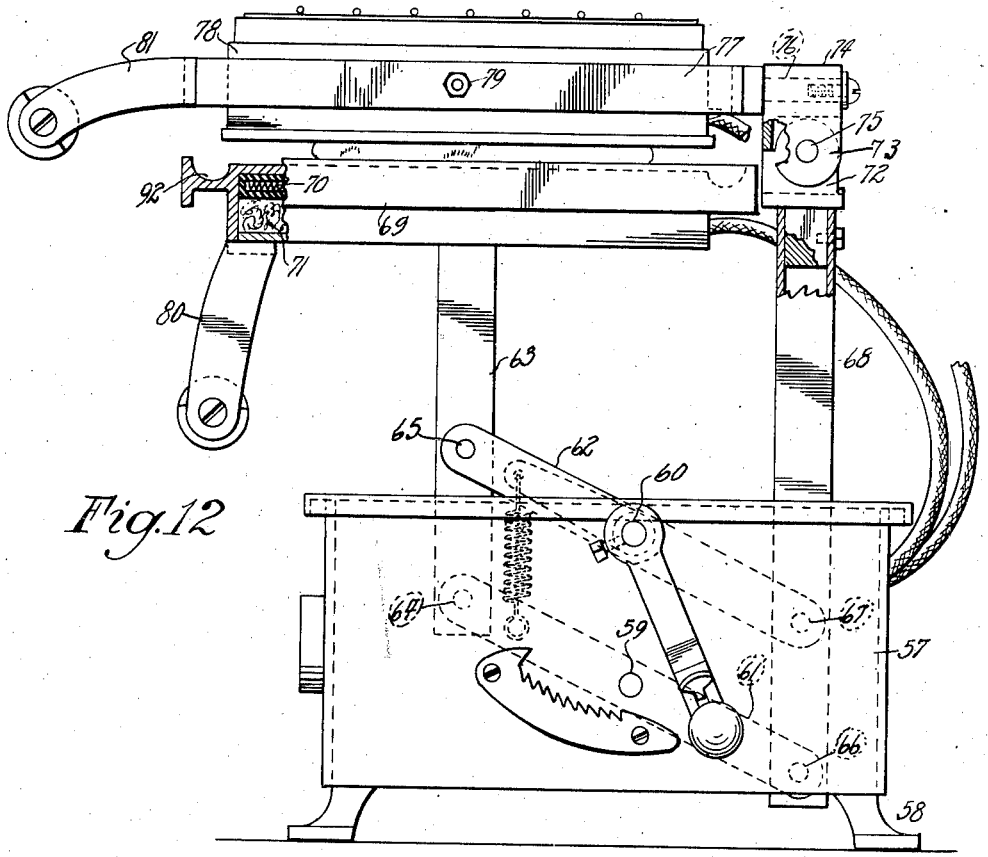
Fig. 12 is a side view of the device shown in Fig. 9.

The food in the skillet may be subjected to the conducted heat emitted from the skillet and the cover 10, when in the position shown in Fig. 3, or may be subjected to radiant glow heat from the heating element 17, when arranged in the position shown in Fig. 4.

In Fig. 4 the cover is slightly modified to be permanently attached to the skillet. Instead of the handle 22, the cover is provided with a trunnion 30 which has a central bore for the passage of the wires 17. The trunnion is received in a bearing 31 formed with a downwardly extending lug 32, received in a U-shaped bracket 33, secured to the skillet handle 27 by rivets 34 or other fastening means. A pivot pin 35 passes through the bracket 33 and the lug 32.

It is evident that the cover may be tilted about the pin 35, and also rotated about the trunnion 30 in the bearing 31 so that the heating element may be received within the skillet or be extraneous thereto, depending on whether radiant glow heat or conducted heat is to be supplied from the top.

Referring to Figs. 5 to 8, inclusive, 36 designates a gas range provided with a pipe 37 and valves 38 for the supply and control of gas, and a plate 39 which supplies conducted heat to the articles placed thereon.

The gas heater may be of the construction shown, but any standard range, heated by any kind of fuel, may be employed, it being the intention to apply the invention of a heating element thereto as an attachment.

At the rear, the range or heater has secured thereto a bracket 40 which is provided with spaced upstanding lugs 40', through which extends a pivot pin 41 which also projects through lugs 42 of an arm 43, to which is loosely secured a heating member 44, which is auxiliary and adapted to cooperate with the plate 39. As shown in Fig. 6, the arm is in the form of a goose neck terminating in a handle 45 and having prongs 46, into whose bifurcated ends extend lugs 47 of a bearing plate 48, secured to the prongs by pivot pins 48.

The member 44 is formed as a casing closed at the top and sides, but open at the bottom. The chamber so formed is divided by a plurality of parallel partitions 49, in which are received insulator bushings 50, through which the heating element 51, in the form of a wire, is strung.

Rods 52 extend crosswise to the partitions and are secured to the sides of the plate to form a protective grating.

The heating element is conducted through an armored cable 53 and thence leads to a plug 54 to be connected to a house socket.

In use the heating member or plate 44 is lowered into a position parallel with the plate 39, so that food articles placed on the plate 39 receive conducted heat from below and radiant glow heat from above.

If desired to speed up the coking process, the space between the plates 39, 44 may be closed by a rectangular frame 55, which has a handle 56 and is adapted to span the gap between the heating plates.

It is evident from the foregoing description that the auxiliary plate constitutes an attachment which may be separately manufactured, and secured to any range already in existence.

Referring to Figs. 9 to 12 and 15 to 17, inclusive, the heating device depicted therein is of the type disclosed in, and an improvement on, U. S. Letters Patent #1,839,112, issued December 29, 1931.

The device includes a base 57, comprising an upstanding hollow shell substantially rectangular in cross section and borne by legs 58.

Transverse shafts 59 and 60, secured in said base, have loosely mounted thereon, two pairs of rocking levers 61 and 62, respectively.

The levers are pivotally secured at the forward ends to a vertical post 63, as at 64 and 65, whereby the levers are maintained at all times in parallel relation to each other and the post in vertical position.

At their rear ends, the levers 61, 62 are pivotally attached as at 66, 67, to a vertical post 68. The post 68 supports a heating member or plate 69, which is hollow and contains an electrical heating element 70, located close to the cooking surface, but insulated therefrom in any approved manner. The chamber is filled with asbestos or other suitable heat confining and insulating material 71.

Mounted on the post 68 is a bracket 72, which is received between downwardly extending lugs 73 of a bearing 74 and transversed by a pivot pin 75.

Into the bearing 74 extends a trunnion 76 of a rectangular frame 77, encompassing the upper heating member or plate 78 and secured thereto by pivot screws 79. The lower plate 69 has a handle 80, whereas the frame 77 has a handle 81 to facilitate manipulation of the upper plate 78.

The upper heating member is hollow and has a heating element 82 near the lower cooking surface insulated therefrom in any appropriate manner and superposed by a layer of asbestos 83. A partition 84 closes the chamber of the plate and is bent upwardly to provide side walls 85.

On the partition 84 are secured the lateral flanges of U-shaped plates 86, which have cut away portions to receive insulators 87, through which a heating element 88 is strung.

The top of the plate is open and has grating rods 89 secured at the ends to angle irons 90, fastened to the upper ends of the side walls 85.

Rods 91 are situated in the bights of the U-shaped plates 86 and secured to the side walls 85.

It is evident that, by the provision of the trunnion 76, either the heating element 82, furnishing conducted heat, or the heating element 88, furnishing radiant glow heat, may be arranged to cooperate with the lower heating plate.

Normally the locking levers 61, 62 are movable freely about the shafts 59, 60 and the two plates 69, 78, through their peculiar supporting arrangements, are counterbalanced.

It is thought unnecessary to describe the mechanism for varying the distance between the heating members and, thereby, vary the pressure on the interposed food material, at the will of the operator, as these features per se do not form the subject matter of the present invention.

Attention is called to the fact that the upper plate 78 is suspended in the frame 77, in such manner that when the plate is in raised position, it slants rearwardly and downwardly, so that a greater open space is afforded for the introduction of food, and also grease on the plate will run down and drop into the groove 92 of the lower plate 69, and thence into the trough 93.

Figures 13, 14:
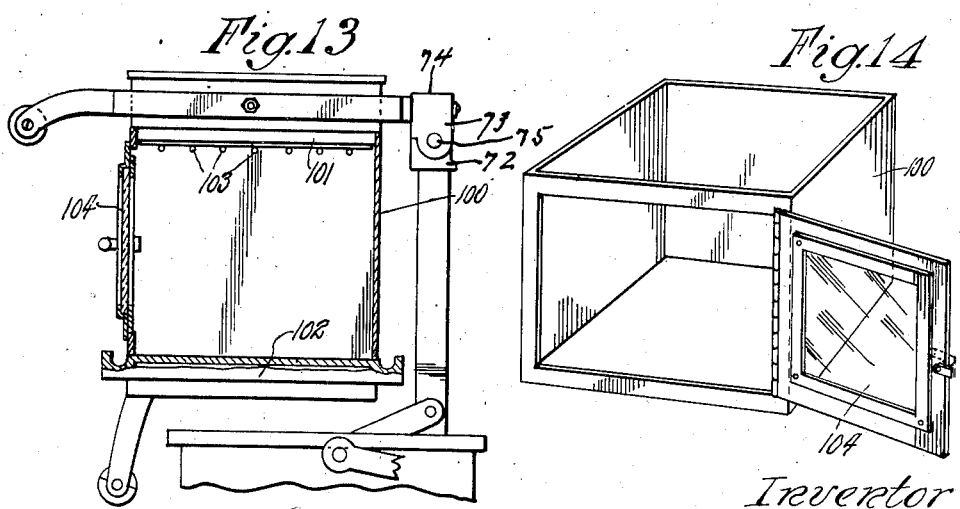
Fig. 13 is a sectional elevation of a stove constructed in accordance with my invention.
Fig. 14 is a perspective view of the oven casing.

In Figs. 13 and 14, a heating device is depicted, which functions as a stove.

A casing of rectangular form 100 and open at the top and bottom is interposed between an upper heating member 101 and a lower heating member 102. The lower member emits conducted heat while the upper member has a grill 103 capable of emitting radiant glow heat.

It is, of course, within the scope of the invention to reverse the heating effects, so that the lower member may emit radiant glow heat while the upper member may emit conducted heat.

The casing is provided with a door 104 affording access to the heating chamber, defined by the casing. The plates 101 and 102 can be actuated to approach and recede from one another, as has been mentioned in the previously described embodiment.

The modification shown in Figs. 18 and 19 depicts a plurality of heating devices arranged in superposed relation, and illustrates a combination arrangement producing radiant glow heat by charcoal and by electricity.

As shown, a hollow casing 105, constituting a base, is provided, on which is mounted a grate 106, forming a support for a layer of charcoal 107, so that upon ignition, radiant glow heat is emitted to the food placed on a second grate 108 above the grate 106.

A heating member or plate 109 is secured to an arm 110 of a post 111, which is connected by parallel links 112 to pendent brackets 113, secured to the top of the base 105. The lower link 112 is connected by a spring 112a to the base 105.

The plate 109 is provided at the lower side with an exposed heating element 114 for the emission of radiant glow heat, while the upper side emits conducted heat.

Again a plate 115 is provided at the top of a casing 116 mounted on the base 105. The plate 115 is constructed similar to plate 109 and is adapted to emit radiant glow heat through its exposed heating element 117, and conducted heat at the opposite side.

A plurality of cooperating heating members or plates 118 are mounted in frames 119a, pivotally secured to posts 119, which are connected by parallel links 120 to bracket 113. The links extend beyond the bracket and are connected by a spring 121.

The purpose of providing the tower arrangement of superposing various heating elements is destined for commercial establishments, steamships, trains, and all other places where space in lateral direction is limited.

The provision of a device with a large number of heating plates, with various kinds of heating surfaces, has the advantage that all kinds of cooking processes, such as frying, toasting, broiling, baking, and the like, may be carried out at one and the same apparatus and at one and the same time, so that the efforts of a chef are concentrated in one place and precludes the hitherto necessary caring for several devices remote from one another.

A further advantage constitutes the fact that, by superposing the heating plates, heat is concentrated and conserved for effective use and losses, due to wasteful radiation, are reduced to an irreducible minimum.

Figure 20:
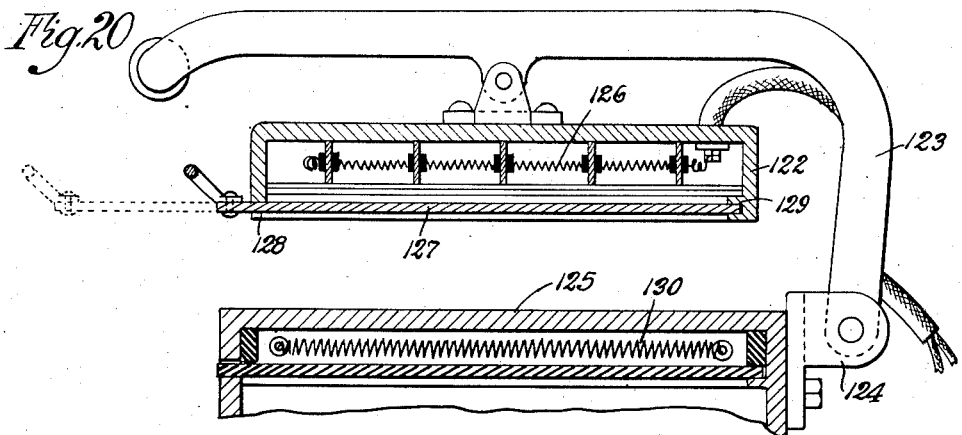
Fig. 20 is a section through a modification of the device shown in Fig. 5.

The modification shown in Fig. 20 shows the same type of heating device as illustrated in Fig. 5, and has the top heating plate 122 secured to an arm 123, pivotally secured to a bracket 124, fastened to a lower heating plate 125.

As shown, the heating plate 122 is hollow and open at the bottom, to permit radiant glow heat to emit from the heating element 126. If desired, the radiant heat of the upper plate may be converted into conducted heat and, to this end, a plate 127 is provided which may be inserted through a slot 128 and is finally seated in a groove 129, and serves to close up the lower open end of the plate 122.

Upon the insertion of the plate 127, heat is transmitted therethrough, so that, instead of radiant glow heat, conducted heat is emitted.

The plate 127 may be made of steel, cast iron, aluminum, or copper, depending on the speed with which the heat is emitted. In the case of steel, or cast iron, more time is consumed with the heating up process than where aluminum or copper is employed.

The lower plate 125 has a heating element 130, under which insulation 131 is provided to restrict the heat from conduction.

The layer of insulation may be removed and instead a plate, similar to plate 127, may be inserted, so as to cause conducted heat to be emitted.

Figure 21:
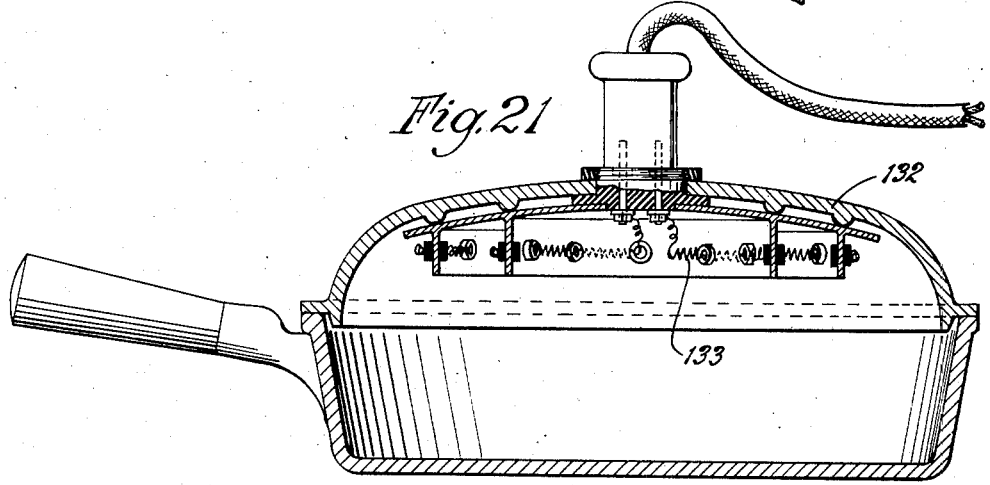
Fig. 21 is a section through a modification of a skillet shown in Fig. 3.

The modification shown in Fig. 21 is a skillet which has a cover 132, in which a heating element 133 is built, capable of emitting radiant glow heat.

Figure 22:
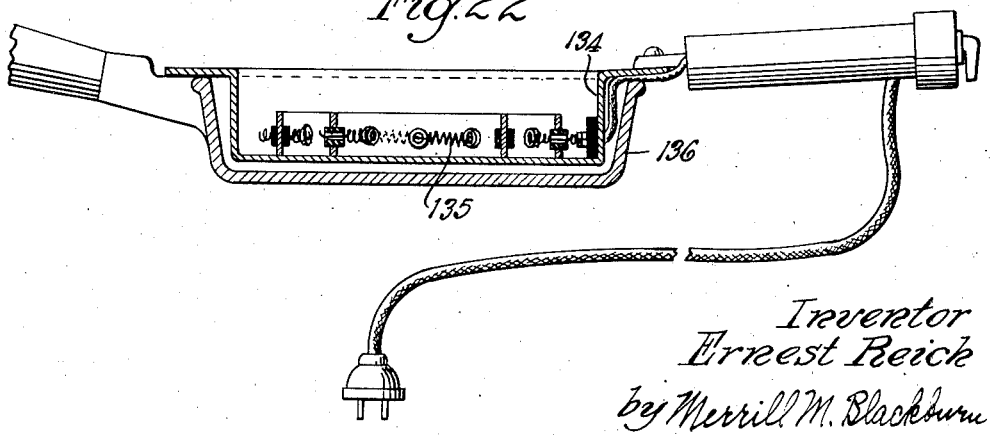
Fig. 22 is a section through a further modification of a skillet.

In Fig. 22, the cover 134 is drawn deep, so that the heating element 135, through the bottom of the cover, emits conducted heat and at the same time, the cover is capable of applying pressure on the food, arranged on the bottom of the utensil 136. Upon reversal of the cover, of course, radiant glow heat is emitted.

While the drawings show preferred embodiments of my invention, various changes, alterations and modifications, both as to the process and the apparatus, may be made.

I, therefore, do not limit myself to the details of construction and arrangement, nor to the particular sequence of steps of the method, but claim my invention as broadly as the state of the art permits.

I claim:

1. The method of preparing food, including the steps of exposing the food to conducted heat on one side and radiant glow heat on the other side and subjecting the food to pressure.

2. The method of preparing food, including the steps of simultaneously exposing the food to conducted heat on one side and radiant glow heat on the other side and subjecting the food to pressure.

3. The method of preparing food, including the steps of exposing the food simultaneously to conducting heat on both sides, and subsequently exposing one side to radiant glow heat.

4. The method of preparing food, including the steps of exposing the food simultaneously to conducted heat on both sides, and subsequently exposing one side to radiant glow heat while the conducted heat on the other side is on.

5. The method of preparing food, including the steps of exposing the food to conducted heat at both sides, the heat being conducted through metal in contact with the food, and consequently changing from conducted heat to radiant glow heat to influence one side of the food, while the other side is continuously subjected to conducted heat.

6. The method of preparing food, including the steps of exposing the food to conducted heat, the heat being conducted through metal in contact with the food, and subsequently changing from conducted heat to radiant glow heat.

ERNEST REICH.